Dec. 18, 1956  J. C. ACTON ET AL  2,774,900
WEBBING OF ROTOR BAR EXTENSIONS
Filed July 20, 1955
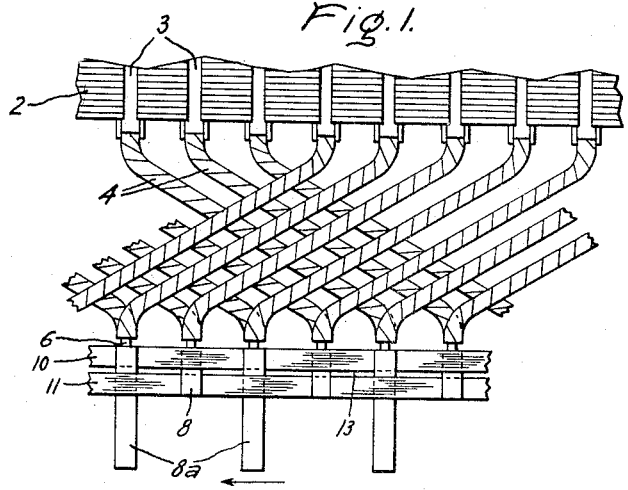
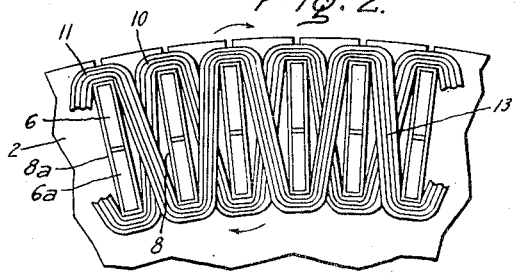
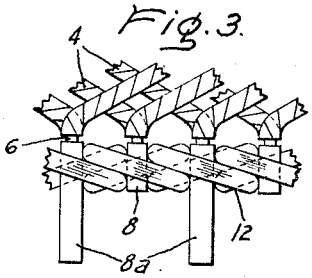
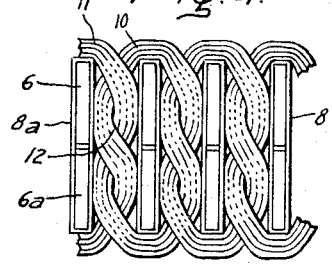
Inventors:
Jack C. Acton,
Albert B. Zeissler,
by
Their Attorney.

United States Patent Office 2,774,900
Patented Dec. 18, 1956

2,774,900

WEBBING OF ROTOR BAR EXTENSIONS

Jack C. Acton and Albert B. Zeissler, Schenectady, N. Y., assignors to General Electric Company, a corporation of New York Application July 20, 1955, Serial No. 523,182

2 Claims. (Cl. 310—270)

This invention relates to the supporting of the end turns of coils for dynamoelectric machines and more particularly to the support of the end turns of bar wound rotor coils.

In special-purpose electric motors such as those used on bridges, shovels, hoists or on other operations which require frequent reversals, or starting and stopping, a squirrel cage rotor having a cast winding of low resistance is normally not suitable. The frequently recurring starting currents which pass therethrough result in the heating of the rotor to the extent that the heat cannot be dissipated within the temperature requirements of electric motors. Accordingly, it is highly desirable to use, in such applications, rotors in which the resistance of the rotor winding can be increased to hold these starting currents to approximately 200% of the full load currents. This has been accomplished generally by the utilization of a bar wound rotor having slip rings by which selected external resistances may be connected to the rotor winding.

It is important from a performance standpoint that the reactance of the rotor be of no more than a certain value to preserve a high value of maximum torque at full speed conditions. In order to obtain the desired optimum reactance without the disadvantage of high flux density in the rotor iron between the slots, due to an extra wide slot, the shape of the slot must be made deep and narrow. Although the reactance increases as the slot is deepened with respect to its width, an additional requirement of satisfactory full load efficiency and speed makes it desirable to use as large a rotor conductor as is practicable. Since the width of the slot is limited by flux density considerations, it is necessary to increase the depth to the maximum permitted by reactance considerations. These various conditions establish a slot which most efficiently utilizes a bar having a height of 4 to 9 times its thickness.

In such coils, it is the practice to connect the end of selected coil sides together by a connection clip to produce the completed winding. Additionally, in order to obtain additional cooling, it has been the practice to extend certain of these connector clips in an axial direction so that they also serve as fan blades to ventilate the motor.

Due to the high ratio of height to thickness of the rotor bars, which results in a construction which is mechanically weak in withstanding twisting forces, the forces placed on the connector clips by rapid accelerating or reversing operation and by the air being pumped thereby cause the rotor bars to twist from their normal radial position. Such twisting, especially in high speed machines, coupled with permanent deformation of the rotor bars after repeated twisting in use, may reach the point where two adjacent clips will contact each other and a short circuit results. It is an object of this invention to overcome this problem.

It is another object of this invention to provide a means for reinforcing the end turns of form wound coils to make such motors suitable for rapid accelerating or reversing operation.

Further objects and advantages of this invention will become apparent and this invention will be better understood by reference to the accompanying drawing and description and the features of novelty which characterize this invention will be pointed out with particularity in the claims annexed to and forming part of this specification.

In accordance with one aspect of this invention, two strips of roving which are impregnated with a thermo-setting resin are arranged as a crisscross brace between each adjacent pair of connector clips and subsequently heated to cure the resin and to brace the ends of the coils against twisting. A modification of this invention includes the use of knots between each adjacent pair of end clips to form a positive spacer block supporting the connection clips in position and preventing the twisting of the rotor bars with the possible resultant short circuit between adjacent rotor bar end turns.

In the drawing,

Fig. 1 is a fragmentary top view of a rotor for a dynamoelectric machine incorporating this invention.

Fig. 2 is a fragmentary end view of the rotor assembly of Fig. 1.

Fig. 3 is a fragmentary top view of a modified form of this invention, and

Fig. 4 is a fragmentary end view of the modification of Fig. 3.

Referring now to the drawings, there is shown a rotor assembly for a dynamoelectric machine including magnetic laminations 2 forming a core for the rotor. Magnetic core member 2 is provided with winding slots 3 in which bar wound coils having end turns 4 are positioned. Magnetic core member 2 is mounted on the shaft (not shown) and is arranged to react electrodynamically with a stator member (not shown) in the usual manner.

In the embodiment shown, it will be noted that each of the end turns 4 terminates in end portions 6 and 6a, which are paired in alignment for electrical connection. In accordance with usual practice, a connection clip 8 connects end turns 6 and 6a to provide an electrical connection therebetween. It will be noted that certain of the end clips, identified by the numeral 8a, are extended in an axial direction from the rotor core to serve as fan blades for cooling the machine. The connection clips 8 and 8a are secured to the end portions 6 and 6a in any suitable manner as by brazing. Connection clips 8 and 8a are normally formed of copper to provide a connection arrangement having the minimum electrical resistance. In operation with, say, the rotor moving in the peripheral direction indicated by the arrow of Fig. 1, the low strength of the rotor bars 4, in withstanding twisting moments, tends to permit fan clips 8a to be twisted by the accelerating forces and the forces of the air being pumped thereby, as indicated by the arrows in Fig. 2. Because of the greater loading thereon, clips 8a twist to a much greater extent that do clips 8, and connector clips 8a tend to twist so that their inner ends approach the next adjacent connector clip 8. Under severe operating conditions, the repeated twisting may result in a progressively increasing set, so that a short-circuit between adjacent clips 8 and 8a may occur, and thus rotors of this type have not been entirely suitable in the past for use in applications requiring frequent sudden starting and stopping of the rotor.

In accordance with this invention, means are provided for reinforcing and bracing the connector clips and the end turns. As shown in Figs. 1 and 2, a strip of roving 10 passes peripherally around the end connector clips 8 and 8a by being placed at the outer side of one connector clip and then between adjacent connector clips to the inner side of the next adjacent connector clip, as best shown in Fig. 2. A second strip of roving 11 is likewise inserted between adjacent connector clips so as to crisscross strip 10 therebetween and to result in a reinforcing brace arrangement between each adjacent pair of connector clips as best indicated in Fig. 2. Although shown in Fig. 1, strips 10 and 11 are axially spaced from one another at their points of crossing 13 between adjacent pairs of connectors 8 and 8a for the purpose of clarity of illustration, it is preferable that strips 10 and 11 be in contact with each other at points 13. Such contact of strips 10 and 11 results in their being bonded together between each adjacent pair of connector clips upon the curing of the thermosetting resin material with which the roving is impregnated. This produces an integral rigid triangular configuration capable of withstanding any flexural, compressive or tensile stresses that may be encountered during service.

The following composition has been found to be a suitable thermosetting resinous material with which to impregnate strips of roving 10 and 11: (1) a polymerizable unsaturated alkyd resin obtained by the esterification reaction of a mixture of ingredients comprising a polyhydric alcohol and an alpha unsaturated alpha-beta polycarboxylic acid, e. g., diethylene glycol maleate; (2) a copolymerizable different monomer, e. g., styrene, polyesters compatible with the above unsaturated alkyd resin obtained by esterification of allyl alcohol with a polybasic acid, specifically a polycarboxylic acid, e. g., diallyl phthalate, etc., in the ratio, by weight, of about 1 part to 1 to 3 parts of (1); (3) a catalyst for accelerating the copolymerization of the ingredients of (1) and (2), e. g., benzoyl peroxide; (4) a polyvinyl acetal resin, specifically a polyvinyl formal resin, in an amount corresponding to from 15 to 75 percent, by weight, of the total of (1), (2) and (4); (5) a volatile solvent for the ingredients of (1), (2) and (4), e. g., ethylene dichloride, a mixture of ethyl alcohol and 1-nitropropane, a mixture of ethyl alcohol and toluene, etc.; and (6) an inhibitor such as quinone or hydroquinone in an amount of approximately .001 percent to .01 percent of the weight of the reactive materials of (1) and (2). The amount of solvent to be used is between 5 and 20, preferably 10, times the amount of the polyvinyl formal resin in the composition.

This composition is particularly well adapted for use in impregnating a self-tightening coil bracing member because it has a volume shrinkage coefficient of 8% and a linear shrinkage coefficient of 2% which it imparts to the coil bracing member during curing.

This impregnated roving material is disclosed and claimed in copending application Serial No. 379,165 of Almy D. Coggeshall et al., now Patent 2,747,118, which is assigned to the assignee of the present invention.

The impregnating composition may be applied to the strips of roving 10 and 11 in any desired manner, preferably by dipping the roving in a bath of an impregnating material. After this impregnation of the roving, it is dried to evaporate the solvents therefrom, so that the roving becomes tack-free. It may then be stored for a period over three months or used immediately.

After the flexible roving is assembled on the rotor as shown in Figs. 1 and 2, the impregnating composition therein may be cured, as for example by baking the rotor assembly at 135° C. for approximately one-half hour.

Referring now to the modification of the invention shown in Figs. 3 and 4, in which like reference numerals indicate like parts, the strips of roving 10 and 11 are installed simultaneously and, in addition to providing a crisscross brace between each adjacent pair of connector clips 8 and 8a, the strips of roving 10 and 11 are arranged in the form of a knot between adjacent pairs of connector clips to provide, upon the curing of the strips of roving 10 and 11, a lump or positive spacer block 12 which is formed integrally with the braces so that it cannot become loose during use. The use of positive spacer blocks 12 between adjacent clips, coupled with the strength and rigidity of the impregnating resin and its capacity to shrink as it is cured, results in an arrangement in which the connector clips and hence the end turns are held securely in position and reinforce each other so that there can be substantially no relative movement or twisting therebetween.

From the foregoing, it is apparent that this invention provides for supporting the end turns of a bar wound rotor by the use of a crisscross arrangement of thermosetting impregnated roving which reinforces the ends of bar wound coils and prevents the short-circuiting of the connecting clips so that the rotor may be used in machines for severe start-stop duty cycles.

We claim as our invention:

1. In a dynamoelectric machine having a rotor member including coil receiving slots, bar wound coils having coil sides disposed in said slots and having end turn portions extending beyond the ends thereof, a plurality of connecting clips arranged at the axial extremities of the end turns for electrically connecting selected ends of individual bars together to form a winding, and means for reinforcing and securing the connecting clips in position comprising strips of fibrous roving impregnated with a thermosetting resin crisscrossed between adjacent pairs of connecting clips, said strips of roving being in contact at the points of crisscross and baked after assembly to form a unitary rigid network comprising a plurality of integral triangular braces spacing the connector clips from each other and reinforcing each connector clip against movement.

2. A dynamoelectric machine having a core member provided with coil receiving slots therein, a bar wound coil having coil sides disposed in said slots and having end turn portions projecting beyond the ends thereof, connector clips for electrically connecting the ends of selected coil sides together to form a winding, and means for supporting said connector clips comprising tying strips crisscrossed between each adjacent pair of connector clips and impregnated with a thermosetting resin baked after installation to produce a unitary rigid supporting network for said connector clips, and tying strips being knotted at the points of criss-cross to provide positive spacing blocks formed integrally with said rigid supporting network.

References Cited in the file of this patent

UNITED STATES PATENTS

| 2,437,990 | Askey | Mar. 16, 1948 |
| 2,602,829 | From et al. | July 8, 1952 |

FOREIGN PATENTS

| 492,045 | Germany | Feb. 15, 1930 |
| 152,689 | Switzerland | May 2, 1932 |